United States Patent
Emerick

(10) Patent No.: US 6,694,921 B2
(45) Date of Patent: Feb. 24, 2004

(54) DOG ASSIST HARNESS

(76) Inventor: Michael W. Emerick, 16391 Riley St., Holland, MI (US) 49424-5816

( * ) Notice: Subject to any disclaimer, the term of this patent is extended or adjusted under 35 U.S.C. 154(b) by 0 days.

(21) Appl. No.: 10/160,477

(22) Filed: May 31, 2002

(65) Prior Publication Data

US 2003/0221634 A1 Dec. 4, 2003

(51) Int. Cl.$^7$ .......................... A01K 15/04; A61D 3/00
(52) U.S. Cl. ..................................... 119/725; 119/728
(58) Field of Search ............................... 119/725, 907, 119/712, 728, 856, 726

(56) References Cited

U.S. PATENT DOCUMENTS

| | | | | |
|---|---|---|---|---|
| 490,053 A | * | 1/1893 | Underkoflev | 119/725 |
| 1,233,309 A | * | 7/1917 | Byrd et al. | 119/725 |
| 3,677,424 A | * | 7/1972 | Anderson | 414/550 |
| 4,644,902 A | * | 2/1987 | Doyle | 119/497 |
| 4,767,099 A | * | 8/1988 | Munks | 254/336 |
| 4,831,967 A | * | 5/1989 | Anderson | 119/725 |
| 5,279,386 A | * | 1/1994 | Cearley | 182/3 |
| 6,062,173 A | * | 5/2000 | Heinrichs | 119/770 |
| 6,216,636 B1 | * | 4/2001 | Butchko | 119/497 |
| 6,463,886 B1 | * | 10/2002 | Rodden et al. | 119/728 |

* cited by examiner

*Primary Examiner*—Charles T. Jordan
*Assistant Examiner*—Judith A. Nelson
(74) *Attorney, Agent, or Firm*—Owen E Perry

(57) ABSTRACT

A harness for dogs with crippled hindquarters. The harness has a sling for supporting the dog's belly near its hindquarters. A D-ring is mounted on each end of the sling. A rod-like handgrip for a human handler is detachably connected with the D-rings by snap-lock connectors. The inside layer of the sling that contacts the dog's skin comprises a launderable barrier fabric of polyester knit textile. The same material is used on the outside layer, but only near the opposite end-portions likely to contact the skin or clothing of the handler. The mid-portion of the outer layer is of polypropylene since it does not normally contact the handler's skin or clothing. The sling of a second embodiment has a composite strap of nylon and sheepskin.

5 Claims, 5 Drawing Sheets

US 6,694,921 B2

DOG ASSIST HARNESS

BACKGROUND OF THE INVENTION

1. Field of the Invention

This invention relates generally to harnesses for dogs (and other four-legged animals), and is particularly concerned with harnesses for assisting dogs that have been crippled in their hind quarters by injury or disease. The invention is particularly concerned with the construction of a harness that can be utilized, with relative ease, by a human handler, to support the wholly or partially disabled hind-quarters of dogs (of weights ranging from 20 to 200 pounds) for treatment by a veterinarian, for grooming, or to help the dog walk and exercise.

2. Description of the Prior Art

Representative prior art U.S. patents in the relevant art include U.S. Pat. No. Des. 330,273 (Cernek-Oct. 13, 1992); U.S. Pat. Nos. 2,976,840 (Hugus-Mar. 28, 1961); 3,215,117 (Short-Nov. 2, 1965); and 4,375,203 (Parkes-Mar. 1, 1983).

SUMMARY OF THE INVENTION

It is not uncommon for pet dogs to become wholly or partially disabled in their hind quarters due to injury or disease. The injury may be either temporary or permanent with the dog being otherwise in good health. In either case, however, it is frequently necessary for a human handler to support the disabled hind quarters of the dog to permit the dog to exercise, to be treated by a veterinarian, to be groomed, and the like.

It is an object of this invention to provide a dog assist harness that can be quickly and easily installed to be utilized by a human handler to support the disabled hind quarters the dog for exercise, and other necessary activities of the type discussed in the preceding paragraph, and which can be easily and quickly removed from the dog.

A further object is to provide such a harness that can be utilized with minimum discomfort to the handler, and can also be cleaned and kept in a clean and sanitary condition with relative ease and efficiency.

The manner in which these, and other objects, are achieved, is set forth in the following description, with reference to the accompanying drawings.

DETAILED DESCRIPTION OF THE PREFERRED EMBODIMENT(S)

Figure 1:
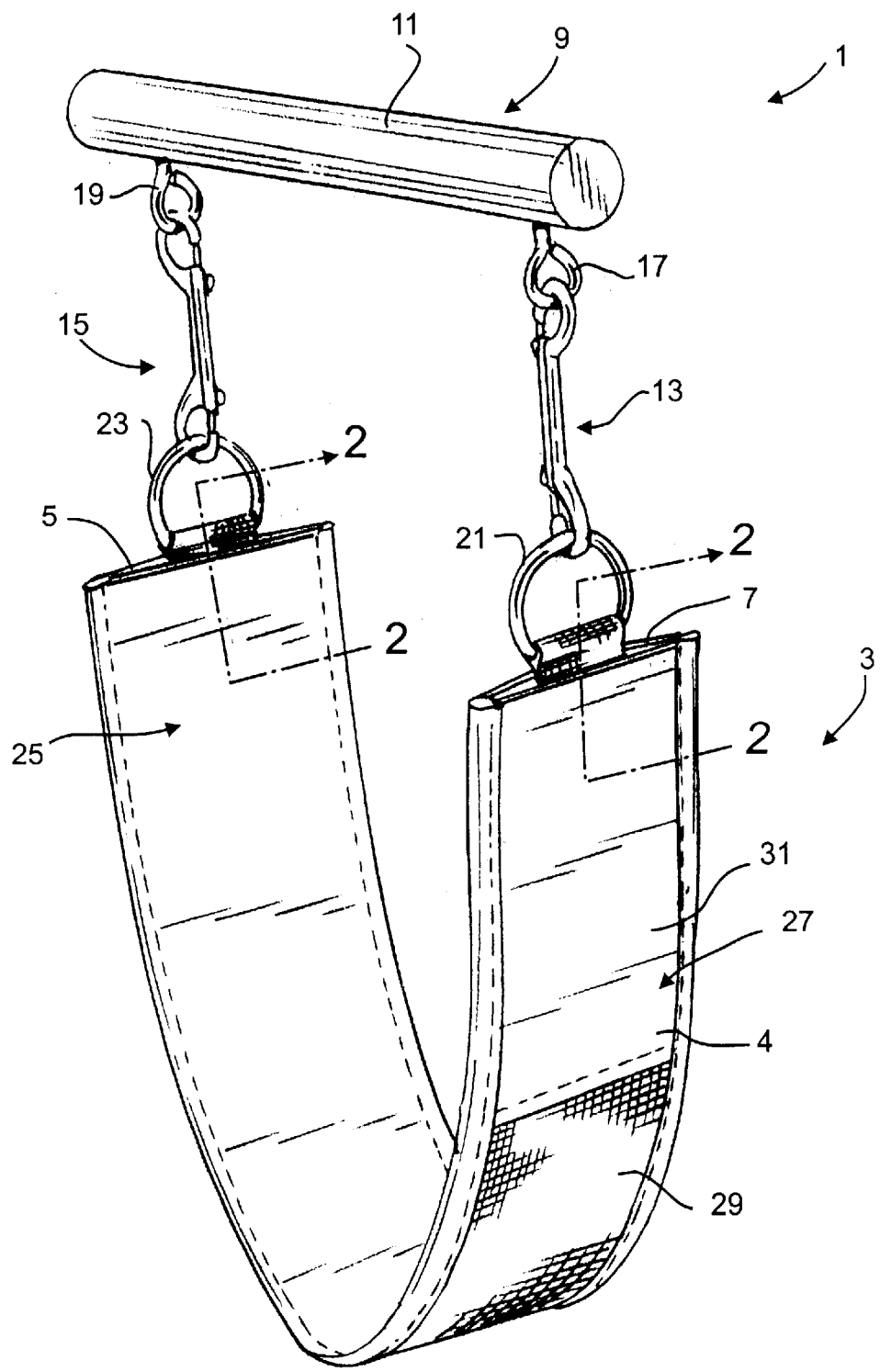
FIG. 1 is a perspective view of harness for crippled dogs according to the present invention.
Figure 2:
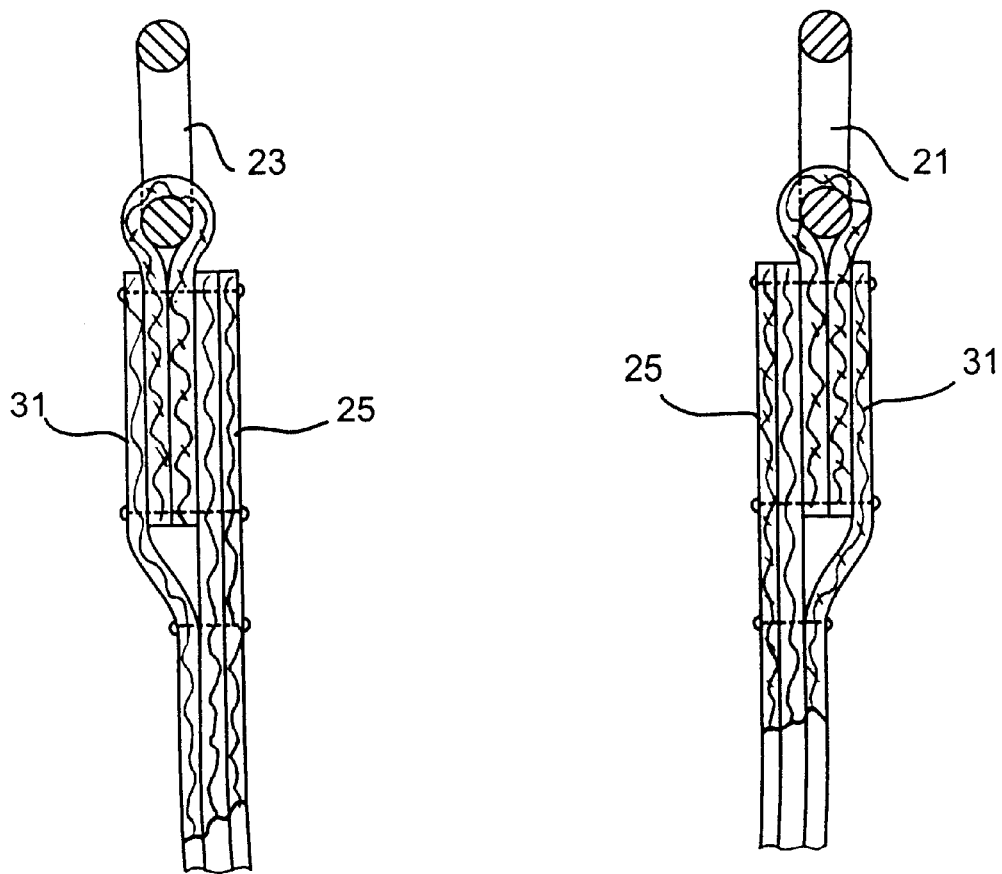
FIG. 2 is a sectional view of a portion of the harness taken on lines 2—2 of FIG. 1.
Figure 3:
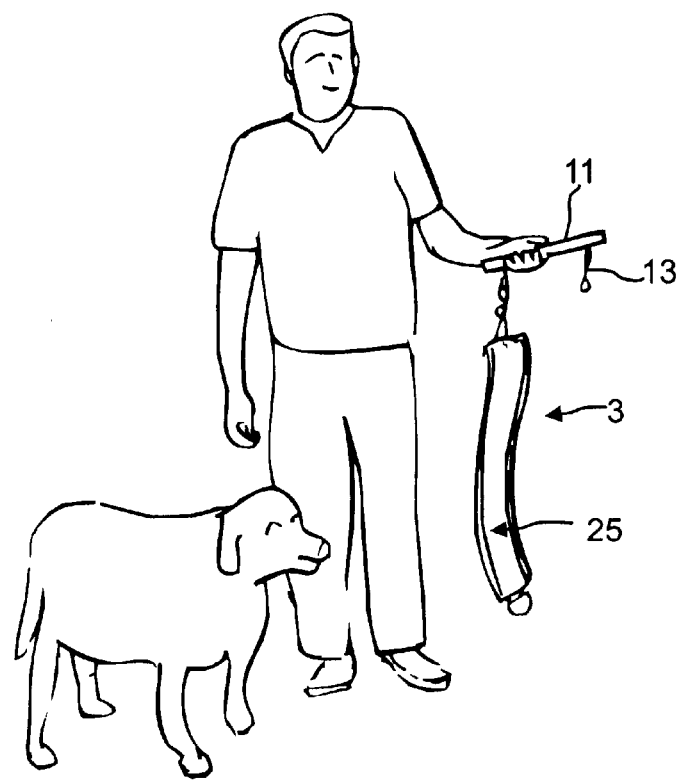
FIGS. 3 and 4 sequentially illustrate the installation of the harness on a dog by the handler.
Figure 4:
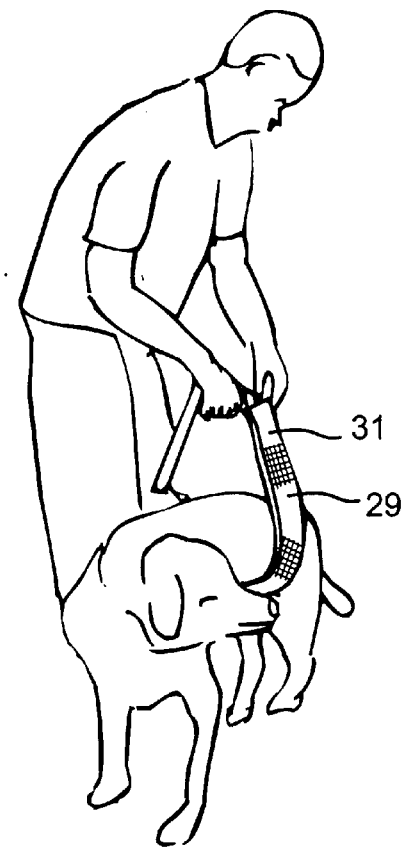

Reference numeral 1 (FIG. 1) collectively designates a harness assembly having, as its major components,(or sub-components) a sling assembly 3, and a manual lifting and control assembly 9 detachably connected with the ends of the sling assembly for transmitting lifting and turning forces from the human handler to the ends of the sling portion.

Figure 5:
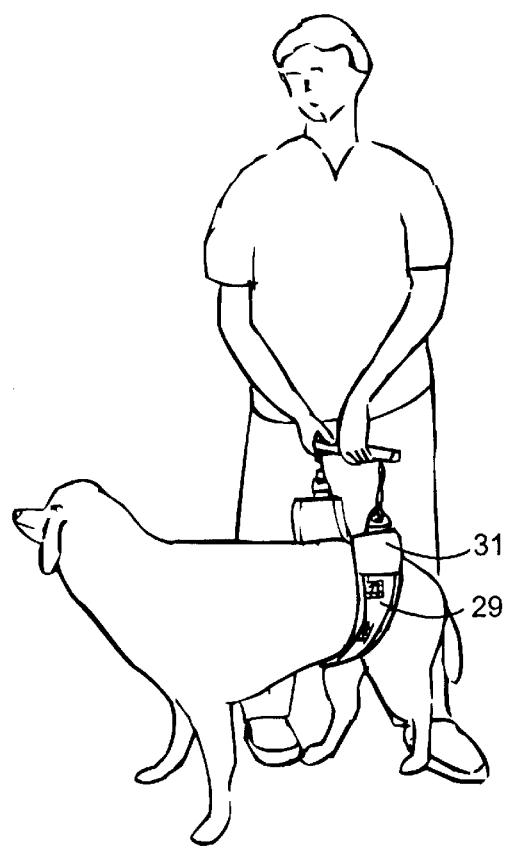
FIGS. 5 and 6 illustrate the manner in which the harness is used to walk a dog.
Figure 6:
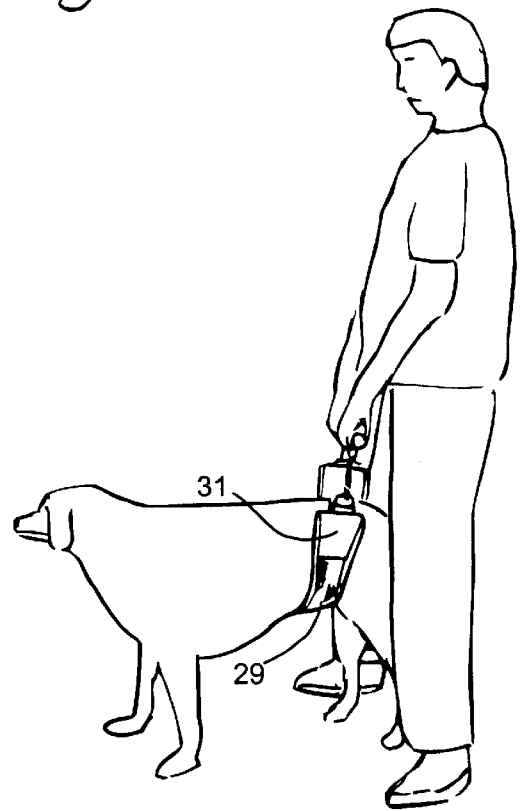

The sling assembly 3 comprises a belt or strap member 4 of flexible material capable of assuming a U-shape for receiving and supporting the belly of a dog near its crippled hind quarters (FIGS. 5 and 6) with the ends 5 and 7 located on opposite sides of the dog's torso.

The lifting and control assembly 9 comprises a handgrip 11 by which the handler manually applies lifting and turning forces to the ends 5 and 7 of the belt member 4 of the sling portion.

In the illustrated embodiment, the handgrip 9 comprises a wooden rod 11, and a pair of screw eyes 17 and 19 are mounted near the opposite ends of rod 11. A pair of conventional, double-ended, snap-lock connectors 13 and 15 detachably connect the screw eyes 17 and 19 to D-rings 21 and 23 projecting from the respective ends 7 and 5 of belt or strap member 4 of the sling assembly (FIG. 1).

The strap member 4 has an inside layer 25 (FIG. 1) for contacting the skin of the dog, and outside layer 27 that does not come into contact with the dog's skin in ordinary use. It is therefore highly desirable that the material of the entire inside surface 25 be of smooth, non-irritating, launderable material that can withstand numerous cycles of washing and drying while maintaining suppleness and impermeability. The preferred material for the inside layer, referred to sometime hereafter in this specification (and in the claims) as "Material A", is the product identified in in the "Family of Launderable Barrier Fabrics from Vintex Inc." in the "Style" column as "Heat Shield" having a weight in the "Total Weight: (oz/yd2) column of 12. The Heat Shield product is described in the "Product Features and Benefits" column as follows:

> We added another durable polyester knit textile to the face of our 8/28 Product to "shield" the polymer barrier from high heat laundering conditions which could cause "fusing" of the polymer face in traditional barrier products. . . .

The Vintex Inc. documents discussed in the preceding paragraphs are attached to this application as Appendix A to this specification, and are incorporated, in their entirety, into this patent application as part of its disclosure so that any reference to "Material A" in this application will mean the Heat Shield product identified in the Vintex Inc. documents incorporated herein.

The outside layer 27 of a second material 29 that extends over a part of the length of outside layer, but less than the entire length (FIG. 1). The second material 29 is preferable of polypropylene. It does not come into contact with either the dog's skin, or with the clothing or skin of the handler during ordinary use of harness as illustrated in FIGS. 3–6. However, the portions 31 of the outer surface adjacent to the ends 5 and 7 of the sling portion do sometimes come into contact with the clothing and/or the skin of the human handler which makes it desirable to use Material A to shield the handler over the end portions of the outer surfaces as shown particularly in FIG. 1 by reference numeral 31.

Figure 7:
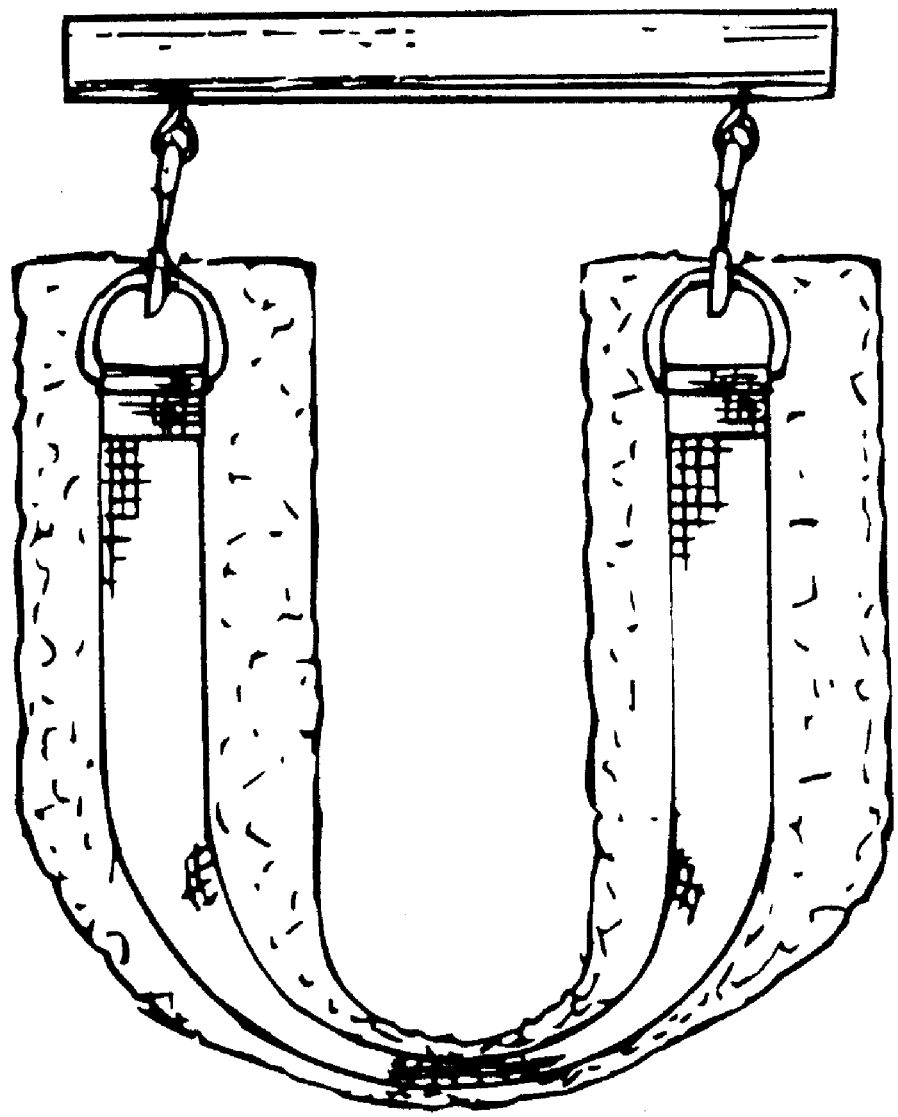
FIG. 7 illustrates an alternative construction of a harness for crippled dogs.

The second embodiment shown in FIG. 7 is fully described in applicant's Provisional Application No. 60/294, 457 which is attached hereto as Appendix B and forms a part of the disclosure of this application.

The invention is not limited to the exact construction disclosed. The claims are intended to embrace all variations and equivalents embraced by the claims construed according to law.

I claim:

1. A harness assembly for crippled dogs, said harness assembly comprising:

a sling portion for supporting the dog's torso;

said sling portion comprising an elongated, flexible strap capable of assuming a general U-shape from a flat, straight condition, so that it can receive the dog's torso at a selected position between the front and rear legs such that the ends of the strap project upwardly from the bight portion of the U on opposite sides of the torso;

said strap having an inside layer with a substantially flat surface for contacting the skin of the dog during ordinary use;

said inside layer being comprised of Material A over at least the portion of the length of said inside layer that comes into contact with the dog's skin during ordinary use;

a handgrip; and connecting means connecting each end of said strap to said handgrip.

2. A harness assembly as claimed in claimed in claim 1 in which said strap has an outside layer that faces oppositely with respect to said inside layer, and which does not contact the dog's skin during ordinary use, but which in portions near the opposite ends, come into contact with the skin or clothing of a human handler during ordinary use; said inside layer being comprised of Material A at least over portions extending respectively from the opposite ends of the strap a selected distance inwardly sufficient to cover said upwardly projecting end portions of the strap.

3. A harness as claimed in claim 2 in which said inside layer comprises two spaced portions of Material A each of which has an inner end spaced inwardly from a respective one of ends of the strap, and from the inner end of the other portion, and said inside layer further comprises a second material that extends between the spaced inner ends of said portions of Material A such said second material does not contact the skin or clothing of a human handler during ordinary use.

4. A harness as claimed in claim 3 in which said second material comprises polypropylene.

5. A harness as claimed in claim 1 in which said handgrip comprises an elongated rod, and said connecting means comprises at least one quick-connect and quick-disconnect connector securing said handgrip to one end of said strap.

* * * * *